UNITED STATES PATENT OFFICE.

EARL K. ELLSWORTH AND BYRON O. CLARK, OF WAHIAWA, TERRITORY OF HAWAII, ASSIGNORS TO TROPIC FRUIT COMPANY, LTD., OF WAHIAWA, TERRITORY OF HAWAII, A CORPORATION OF THE TERRITORY OF HAWAII.

MACHINE FOR CUTTING PINEAPPLES.

No. 862,241.   Specification of Letters Patent.   Patented Aug. 6, 1907.

Application filed November 4, 1905. Serial No. 285,880.

*To all whom it may concern:*

Be it known that we, EARL K. ELLSWORTH and BYRON O. CLARK, citizens of the United States, and residents of Wahiawa, county of Oahu, Territory of Hawaii, have invented a new and useful Machine for Cutting Pineapples, of which the following is a specification.

The invention relates to machines for the preparation of pineapples for bottling or canning, and particularly to machines for cutting and coring the fruit after it has been peeled; and the object of the invention is to produce a machine of this character which will prepare the fruit in a more attractive manner for such purpose than has heretofore been done.

The usual method of preparing the pineapple after peeling is to remove the core and slice the fruit at right angles to its axis into washer shaped pieces. By our invention the pineapple after peeling is cut longitudinally with respect to the axis of its core, into prism shaped pieces, and at the same time the core is cut out in one prism shaped piece. The tough fibers which radiate outward from the core of the fruit are thus cut and lie across and at right angles to the axes of the prisms, instead of being retained intact as heretofore in the washer shaped pieces above mentioned. We accomplish this result by passing the peeled fruit through a machine provided with an upper and a lower pair of oppositely disposed gangs of revolving disks or knives, each pair cutting at right angles to the other pair, the central knives of each gang being smaller in diameter than the other knives so that the core is left intact in one prism larger than the prisms cut by the other knives, the friction of the knives forcing the fruit through the machine and ejecting it thus cut onto the sorting table or upon a conveyer for distribution to the packers.

This specification is a specific description of one form of the invention, while the claims are definitions of the actual scope thereof.

Reference is to be had to the accompanying drawings, forming a part of this specification, in which similar characters of reference indicate corresponding parts in the views.

Figure 1:
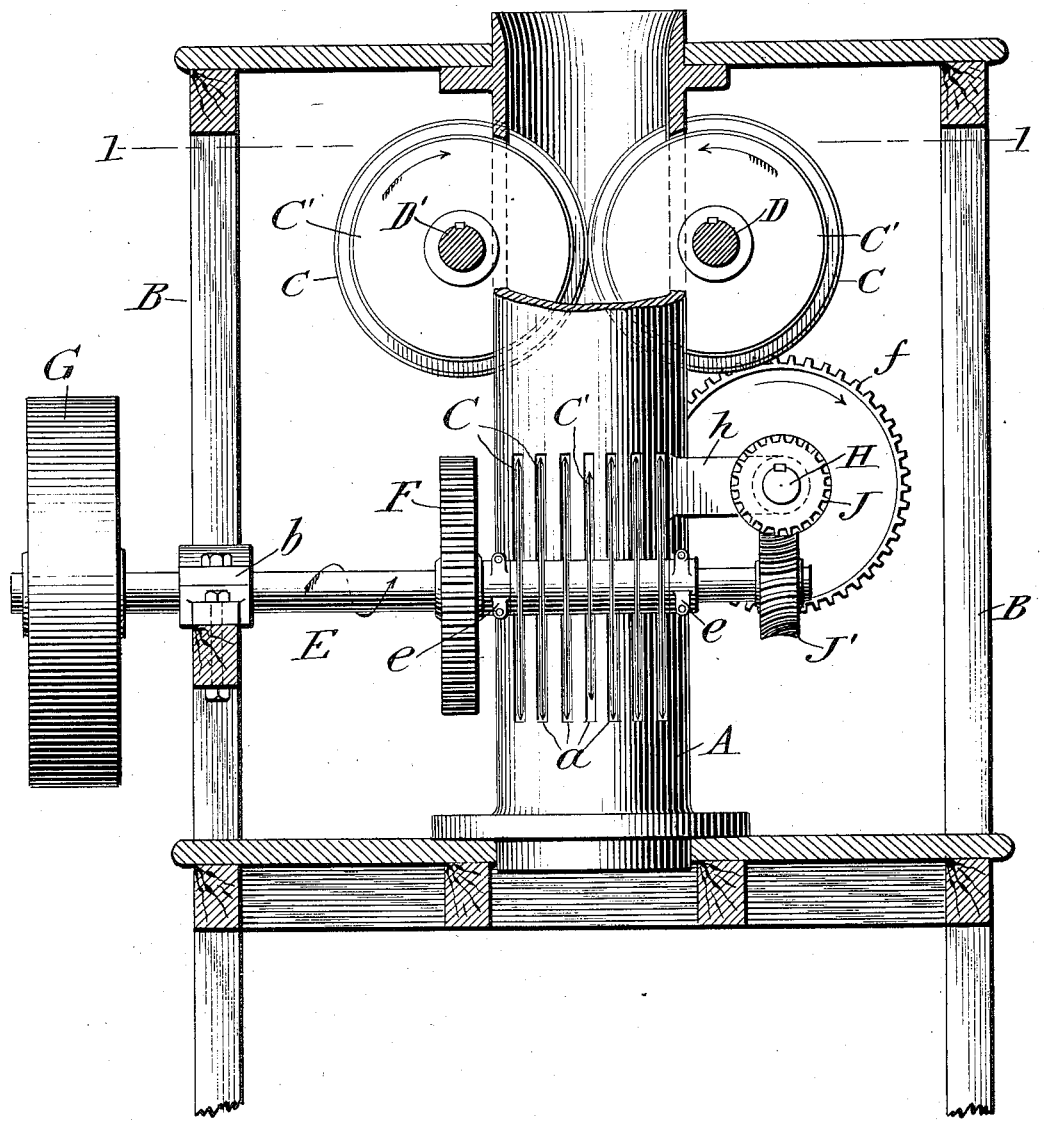
Figure 2:
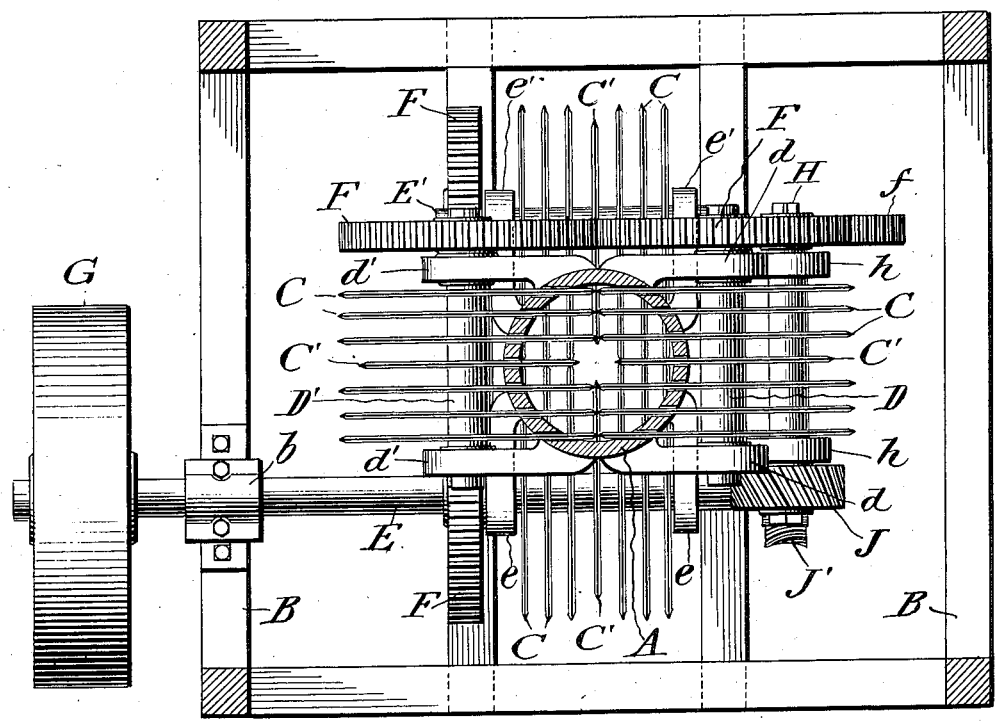

Figure 1 represents in side elevation and part section one form of machine embodying our invention. Fig. 2 is a sectional plan on the line 1 1 of Fig. 1.

Supported inside of a wooden or other suitable frame work B is the body A which is essentially a tube of a suitable size to receive the fruit when peeled to a standard size. While the tubular body A is shown cylindrical it may be made polygonal or any suitable shape. The body A is provided with parallel longitudinal slots $a$ in its opposite sides, through which circular disks or knives C C' enter and project into said body. The knives C C' are mounted in gangs on the arbors D D' and E E' respectively. The arbors D D' are disposed parallel to each other on opposite sides of the body A and are journaled in the boxes $d\ d'$ respectively attached to or a part of the upper portion of said body. The arbors E E' are disposed on opposite sides of the body A, and journaled in the boxes $e\ e'$ respectively attached to or a part of the lower portion of said body, but so located that the planes of the knives C C' on the arbors E E' are at right angles to the planes of the knives C C' on the arbors D D'. The distance between the centers of the arbors D and D' is equal to or a trifle greater than the diameter of the disks or knives C. The distance between the arbors E and E' is similar. The central knife C' of each gang is preferably of a smaller diameter than that of the other knives C. The arbors D D' extend outside of the boxes $d\ d'$ and are geared together by the spur gears F. The arbors E E' are similarly geared together. The arbor E is extended through the box $b$ supported by the frame B and is provided with a pulley G for connection to any suitable motive power. An intermediate shaft H is journaled parallel to and below the arbor D in the boxes $h$ and is provided with a spur gear $f$ which meshes with the gear F on the arbor D. A spiral gear J on the shaft H meshes with a similar gear J' on the arbor E.

It will now be noted that when the arbor E is revolved in the direction as indicated by the arrow that each gang of knives will revolve in an opposite direction to that of the gang which is opposite it, and that the motion of all the knives within the body A is downward, the friction of which in cutting draws the fruit downward through said body. The knives of the upper gangs slice the fruit, and then those of the lower gangs cut the slices into prisms. The body A holds and guides the fruit while being cut. The upper and lower gangs of knives are preferably placed near enough to one another so that the downward motion of the fruit is continuous. The knives C' being smaller in diameter than the other knives C, the core is left intact in one prism which is larger than the prisms cut by the other knives. The fruit thus cut is ejected from the body A and falls onto the sorting table or upon an apron conveyer (not shown) upon which it is carried to the sorters and packers. It is obvious that if the knives are all made of the same diameter that the core would be cut into more than one prism. The cross-section of most of the prisms cut by the machine shown is square, while irregularly shaped prisms are cut from the periphery of the fruit. It is also obvious that if the upper and lower pairs of oppositely disposed gangs of knives are arranged otherwise than at right angles to one another that the cross-section of the prisms will be rhomboidal.

In practice we make the knives about five-eighths of an inch apart and the central knives C' about one inch smaller in diameter than the knives C, which leaves the core in a prism having a cross-section about one inch square. When it is only desired to slice the fruit, one pair of gangs of knives are removed or dispensed with.

Having thus described our invention, what we claim, and desire to secure by Letters Patent, is—

1. A machine for cutting pineapples and the like, comprising oppositely disposed gangs of cutters, and means for revolving the same, the central cutter of each gang being of smaller diameter than the other cutters.

2. A machine for cutting pineapples and the like, comprising a tubular body or casing of a diameter approximately that of the article to be cut, a gang of cutters projecting through slots in said tube or casing, and a second gang of cutters also projecting through slots in the casing and arranged at an angle to the first mentioned gang of cutters, the central cutter of each gang being of smaller diameter than the other cutters.

3. A machine for cutting pineapples and the like, comprising a tubular body or casing of a diameter approximately that of the article to be cut, and oppositely disposed gangs of cutters projecting through slots in said tube or casing, the central cutter of each gang being of smaller diameter than the other cutters.

4. A machine for cutting pineapples and the like, comprising a tubular body or casing of a diameter approximately that of the article to be cut, an upper and lower pair of oppositely disposed gangs of disks or knives projecting through slots in said tube or casing, the central knife or disk of each gang being of smaller diameter than the other knives or disks, and means for revolving said disks or knives.

In testimony whereof we have signed our names to this specification in the presence of two subscribing witnesses.

EARL K. ELLSWORTH.
BYRON O. CLARK.

Witnesses:
 ROBT. J. PRATT,
 HENRY G. GINACA.